(12) United States Patent
Allen (10) Patent No.: US 11,287,096 B1
(45) Date of Patent: Mar. 29, 2022

(54) DECK LIGHT

(71) Applicant: Research & Design Innovations, LLC, Branford, CT (US)

(72) Inventor: Donald Terry Allen, Madison, CT (US)

(73) Assignee: Research & Design Innovations, LLC, Branford, CT (US)

(*) Notice: Subject to any disclaimer, the term of this patent is extended or adjusted under 35 U.S.C. 154(b) by 0 days.

(21) Appl. No.: 17/015,815

(22) Filed: Sep. 9, 2020

Related U.S. Application Data (60) Provisional application No. 62/897,674, filed on Sep. 9, 2019.

(51) Int. Cl.
| | | |
|---|---|---|
| *F21S 41/00* | (2018.01) | |
| *F21S 41/19* | (2018.01) | |
| *F21S 8/00* | (2006.01) | |
| *F21S 45/50* | (2018.01) | |
| *B60Q 1/00* | (2006.01) | |
| *B63B 45/06* | (2006.01) | |
| *F21W 107/10* | (2018.01) | |
| *F21W 107/20* | (2018.01) | |

(52) U.S. Cl.
CPC .......... *F21S 41/192* (2018.01); *B60Q 1/0088* (2013.01); *B63B 45/06* (2013.01); *F21S 8/032* (2013.01); *F21S 45/50* (2018.01); *F21W 2107/10* (2018.01); *F21W 2107/20* (2018.01)

(58) Field of Classification Search
CPC . B63B 45/04; F21S 8/032; F21S 45/50; F21S 41/192; B60Q 1/0088
See application file for complete search history.

(56) References Cited

U.S. PATENT DOCUMENTS

| | | | | | |
|---|---|---|---|---|---|
| 2,593,171 | A | * | 4/1952 | Morse | B63B 45/02 362/477 |
| 2,966,579 | A | * | 12/1960 | Malec | B63B 45/02 362/369 |
| 4,219,871 | A | * | 8/1980 | Larrimore | B63B 45/04 362/264 |
| 4,429,350 | A | * | 1/1984 | Guthrie | F21L 14/00 362/109 |
| 4,884,173 | A | * | 11/1989 | Cassidy | B60Q 1/24 362/477 |

(Continued)

*Primary Examiner* — Gerald J Sufleta, II
(74) *Attorney, Agent, or Firm* — DeLio Peterson & Curcio LLC; Thomas E. Ciesco (57) ABSTRACT

A light fixture for mounting in a surface opening of a marine vessel or RV including a cylindrical base member having external threads, a light source disposed on a first end of the cylindrical base member and a light source cover having a cover opening for emitting light produced by the light source. The light fixture includes a cover rim extending radially outward from the light source cover and a first connector disposed on a second end of the cylindrical base member, the first connector having electrical connection pins inside a cavity. The first connector is engageable with a second connector. The second connector includes powered pins which electrically connect to the electrical connection pins to power the light source. The light fixture includes a securing ring having internal threads engageable with the cylindrical base member external threads, the cylindrical base member mountable the surface opening.

16 Claims, 6 Drawing Sheets

(56) References Cited

U.S. PATENT DOCUMENTS

| | | | | | |
|---|---|---|---|---|---|
| 5,664,866 | A | * | 9/1997 | Reniger | B63B 45/04 |
| | | | | | 362/310 |
| 5,672,004 | A | * | 9/1997 | Schmidt, Jr. | B63B 45/02 |
| | | | | | 362/421 |
| 5,704,704 | A | * | 1/1998 | Reichard | B60Q 1/2657 |
| | | | | | 362/267 |
| 5,800,041 | A | * | 9/1998 | Poggi | F21S 8/024 |
| | | | | | 362/101 |
| 6,139,170 | A | * | 10/2000 | Wiggerman | B60Q 1/26 |
| | | | | | 340/984 |
| 6,802,633 | B1 | * | 10/2004 | VandenBossche | B63B 17/00 |
| | | | | | 362/191 |
| 10,701,922 | B1 | * | 7/2020 | Larsson | F21S 4/26 |
| 2008/0165547 | A1 | * | 7/2008 | Amor | F21V 29/767 |
| | | | | | 362/373 |
| 2010/0002435 | A1 | * | 1/2010 | Rash | F21V 31/005 |
| | | | | | 362/235 |
| 2011/0242819 | A1 | * | 10/2011 | Mitchell | B60Q 1/0483 |
| | | | | | 362/311.02 |
| 2013/0076269 | A1 | * | 3/2013 | Shilton | H05K 13/00 |
| | | | | | 315/360 |
| 2016/0018093 | A1 | * | 1/2016 | Van Winkle | F21V 23/006 |
| | | | | | 362/311.02 |

* cited by examiner

DECK LIGHT

BACKGROUND OF THE INVENTION

1. Field of the Invention

The present invention relates to a light for illuminating the surface of a deck, wall, ceiling or other marine vessel or RV part.

2. Description of Related Art

Most light sources provided for marine vessels must be carefully installed to look professional, provide adequate lighting and maintain safety before, during and after installation. Since they generally include wiring which requires connection to existing wiring, a light which may be safely installed with mating connectors is needed and since the light will be used in freshwater or saltwater conditions, the connection must be secure and waterproof.

SUMMARY OF THE INVENTION

Bearing in mind the problems and deficiencies of the prior art, it is therefore an object of the present invention to provide a clean, easy installation of a light source on a marine vessel without having to deal with issues such splicing light source wiring with marine vessel wiring.

It is another object of the present invention to provide an integrated light and connector system which provides a quick, secure and waterproof connection, the present invention requires no tools for installation and may be mounted quickly and neatly.

It is another object of the present invention to provide an integrated light that an installer needs only to prepare an opening for the light and provide a corresponding connector for powering the light.

Still other objects and advantages of the invention will in part be obvious and will in part be apparent from the specification. The above and other objects, which will be apparent to those skilled in the art, are achieved in the present invention which is directed to a light fixture for mounting in a surface opening of a marine vessel or RV. The light fixture includes a cylindrical base member having external threads, a light source disposed on a first end of the cylindrical base member and a light source cover having a cover opening for emitting light produced by the light source. The light fixture includes a cover rim extending radially outward from the light source cover, the rim having a rim diameter greater than an opening diameter of the surface opening and a first connector disposed on a second end of the cylindrical base member, the second end opposite the first end, the first connector having a cavity and electrical connection pins inside the cavity. The first connector is engageable with a second connector. The second connector includes powered pins which electrically connect to the electrical connection pins to power the light source. The light fixture includes a securing ring having internal threads engageable with the cylindrical base member external threads, the cylindrical base member mountable in an opening on the surface of the marine vessel. The light source cover may include a mask portion for preventing the light from being emitted in a specific direction. The emitted light may be directed in a direction substantially perpendicular to an axis of the cylindrical base member. The emitted light may be directed in a direction substantially parallel to an axis of the cylindrical base member. The light source cover may include a protrusion for including a flat portion, angled side portions and an angled portion extending from the rim to the flat portion. The light source cover may include a domed portion and a circular dome opening for directing the light in a direction substantially parallel to the axis. The first connector may be a female deutsch connector with the second connector being a male deutsch connector. The first connector may be a male deutsch connector with the second connector being a female deutsch connector.

Another aspect of the invention is directed to a method for mounting a light fixture in a surface opening of a marine vessel or RV. The method includes providing a light fixture having a cylindrical base member having external threads, a light source disposed on a first end of the cylindrical base member, a light source cover having a cover opening for emitting light produced by the light source, a cover rim extending radially outward from the light source cover, the rim having a rim diameter greater than an opening diameter of the surface opening, a first connector disposed on a second end of the cylindrical base member, the second end opposite the first end, the first connector having a cavity and electrical connection pins inside the cavity, the first connector engageable with a second connector, the second connector having powered pins which electrically connect to the electrical connection pins to power the light source and a securing ring having internal threads engageable with the cylindrical base member external threads, the cylindrical base member mountable in an opening on the surface of the marine vessel. The method includes ensuring the securing ring is separate from the cylindrical base member and placing the cylindrical base member through the opening on the surface of the marine vessel. The method includes ensuring the securing ring is engaged with the external base threads and rotating the securing ring until the securing ring contacts the surface of the vessel adjacent the surface opening and securing a second connector to the first connector, the second connector including an electrical wire which is powerable by a power source on the marine vessel or RV.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-16 of the drawings in which like numerals refer to like features of the invention.

Figure 1:
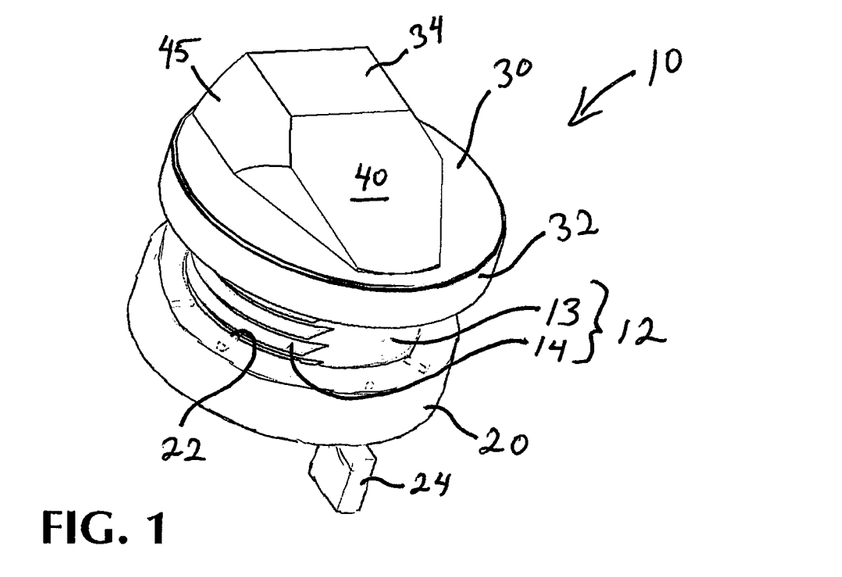
FIG. 1 is a top rear right perspective view of the "DECK LIGHT" design according to the present invention.
Figure 2:
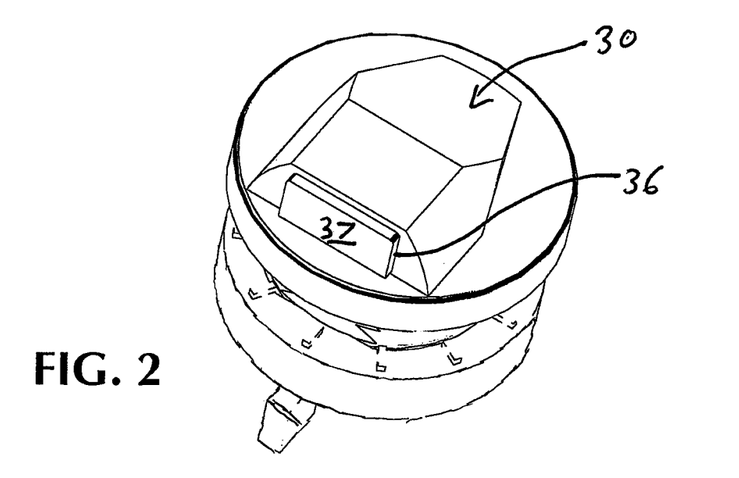
FIG. 2 is a top front right perspective view of the "DECK LIGHT" shown in FIG. 1.
Figure 3:
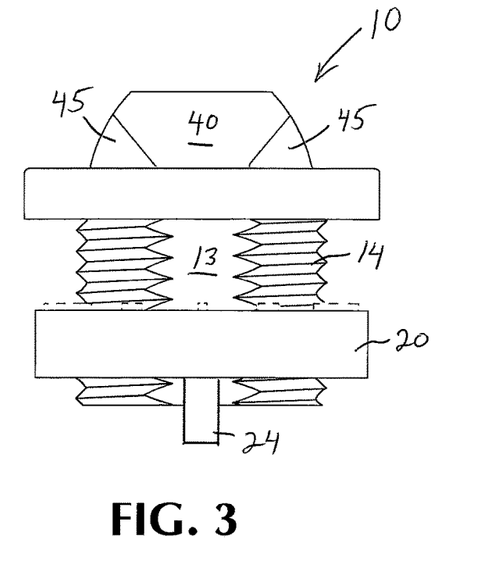
FIG. 3 is a rear elevational view of the "DECK LIGHT" shown in FIG. 1.
Figure 4:
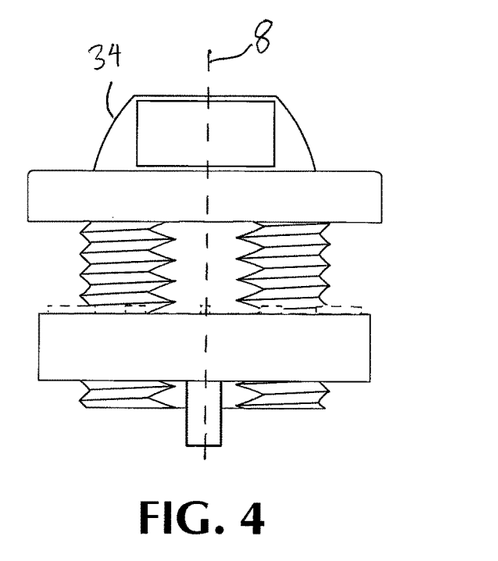
FIG. 4 is a front elevational view of the "DECK LIGHT" shown in FIG. 1.
Figure 5:
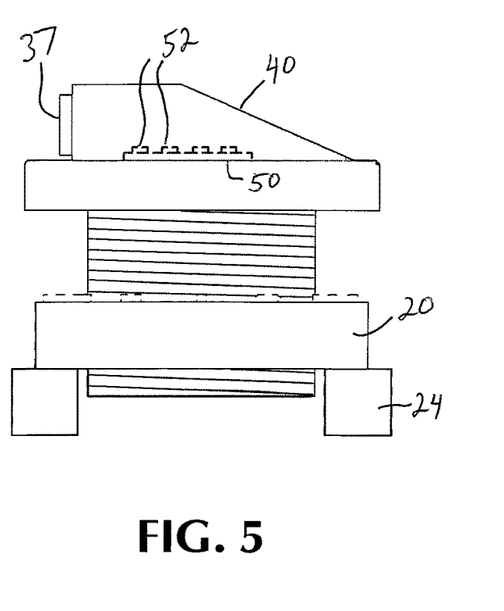
FIG. 5 is a right side elevational view of the "DECK LIGHT" shown in FIG. 1.
Figure 6:
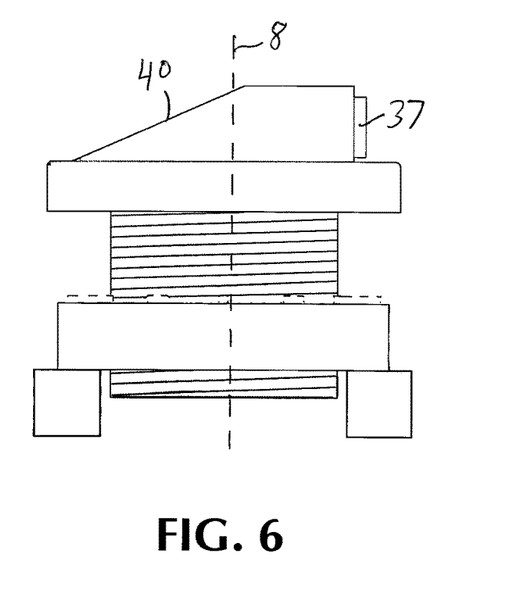
FIG. 6 is a left side elevational view of the "DECK LIGHT" shown in FIG. 1.
Figures 7, 8:
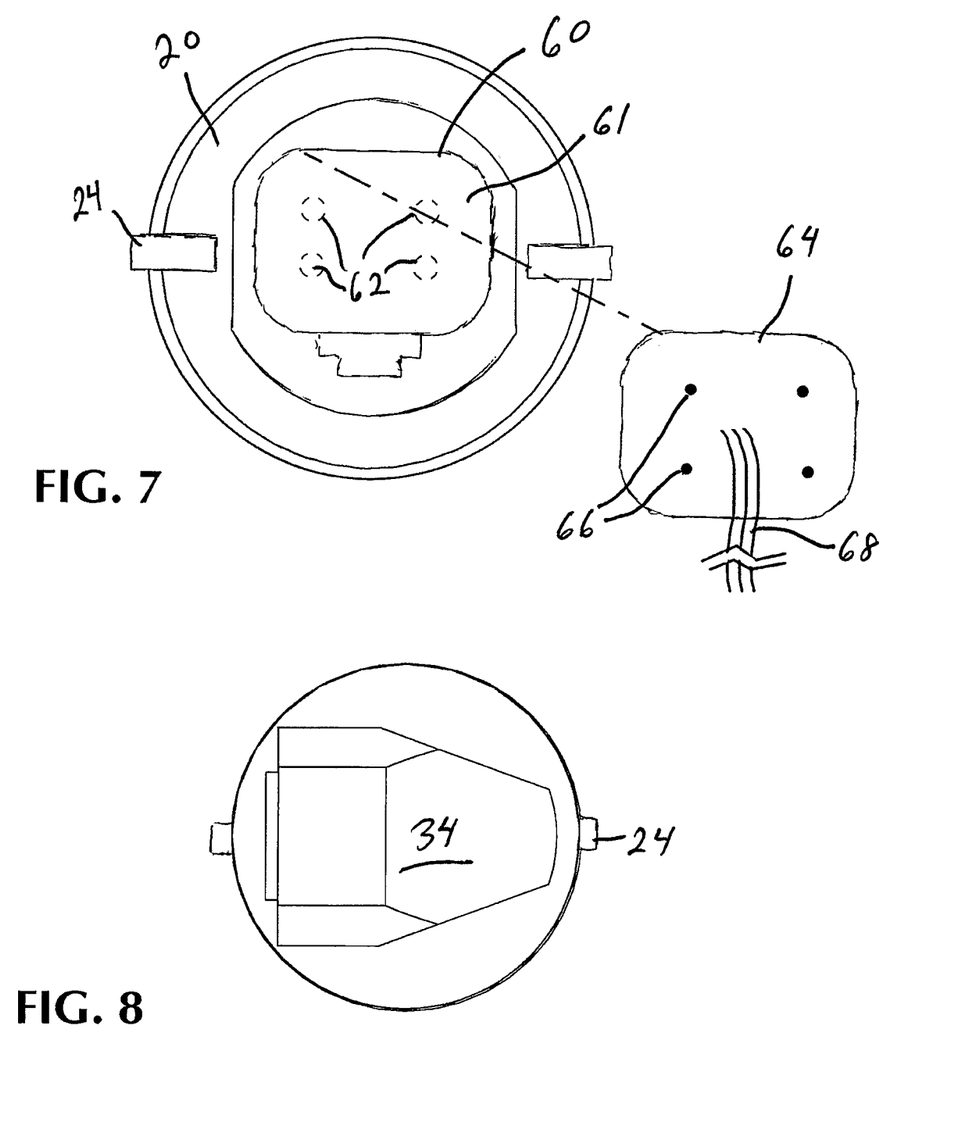
FIG. 7 is a bottom plan view of the "DECK LIGHT" shown in FIG. 1.
FIG. 8 is a top plan view of the "DECK LIGHT" shown in FIG. 1.
Figure 9:
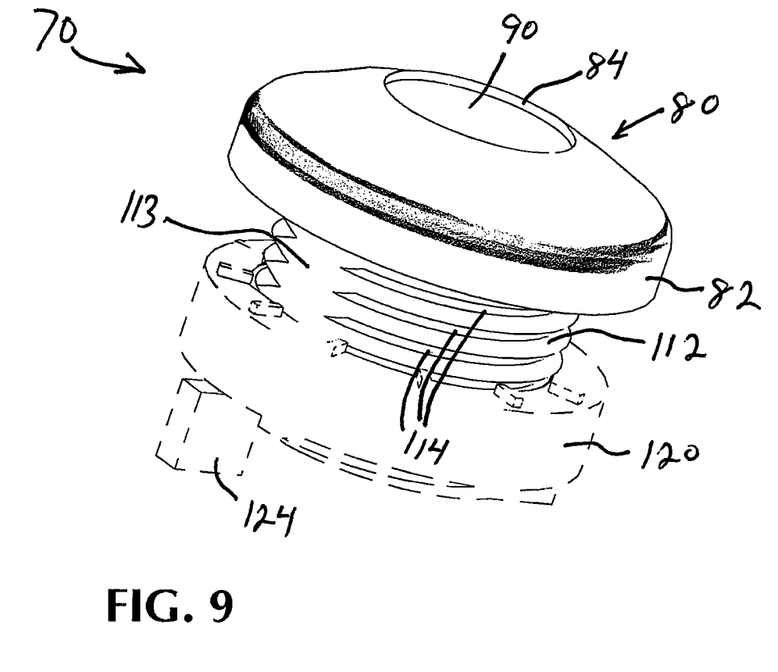
FIG. 9 is a top rear right perspective view of a second embodiment of the "DECK LIGHT according to the present invention.
Figure 10:
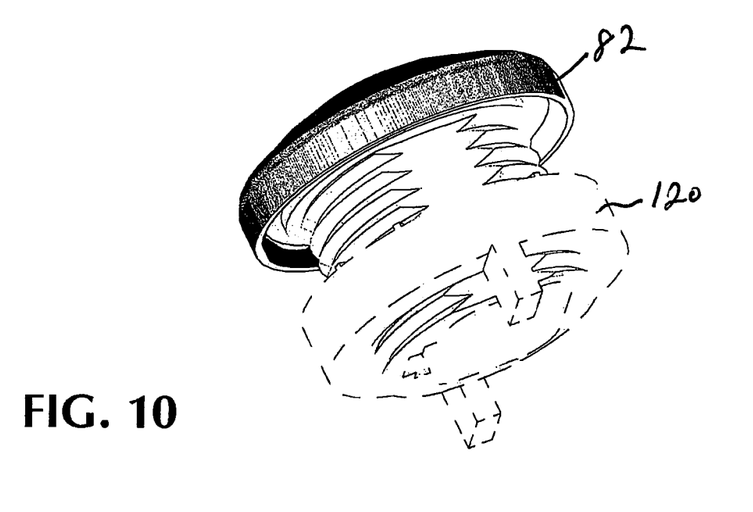
FIG. 10 is a bottom front right perspective view of the second embodiment of the "DECK LIGHT" shown in FIG. 9.
Figure 11:
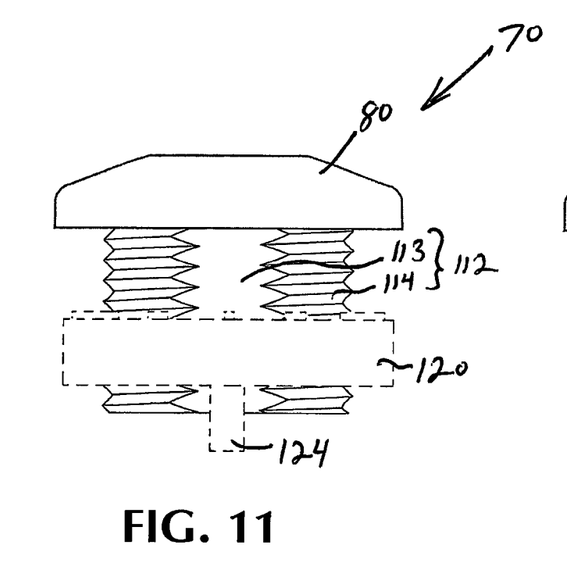
FIG. 11 is a rear elevational view of the second embodiment of the "DECK LIGHT" shown in FIG. 9.

FIGS. 1-8 show a first embodiment of a deck light or light fixture 10 for mounting in a surface opening on a surface of a marine vessel. The light fixture 10 includes a cylindrical base member 12 having external threads 14 and a light source 52 disposed on a first end of the cylindrical base member 12. The cylindrical base member 12 has an axis 8 as shown in FIGS. 4 and 6. The light fixture 10 includes a mask or light source cover 30 having a cover opening 36 for emitting light produced by the light source 52 and a cover rim 32 extending radially outward from the light source cover 30, the rim 32 having a rim diameter greater than the marine vessel surface opening. The cover opening 36 may include a transparent lens 37 for protecting the light source from moisture or debris. The light source cover 30 includes a bulge or protrusion 34 for masking or directing the light in a specific pattern and direction. The protrusion 34 includes flat portion 42, angled side portions 45 and an angled portion 40 extending from the rim 32 to the flat portion 42. The light fixture 10 directs light substantially perpendicular to the axis 8 so that when the light fixture 10 is installed in a vertical surface, the light may be directed downward for illuminating a horizontal surface such as a surface for foot traffic.

The light fixture 10 includes a female deutsch connector 60 disposed on a second end of the cylindrical base member 12, the second end opposite the first end. The female deutsch connector 60 has a cavity 61 and electrical connection pins 62 inside the cavity 61, the female deutsch connector 60 engageable with a male deutsch connector 64. The light source 52 may be mounted on a circuit board 50 for connecting the light source 52 to the deutsch connector 60. The male deutsch connector 64 includes powered pins 66 energized by marine vessel wires 68 which electrically connect to the electrical connection pins 62 to power the light source 52. The light fixture 10 includes a securing ring 20 having internal threads 22 engageable with the cylindrical base member external threads 14, the cylindrical base member 12 mountable in an opening on the surface of the marine vessel. The securing ring 20 may include tabs 24 for rotation of the securing ring 20 about the cylindrical base member 12. The cylindrical base member 12 may include a base flat portion 13 for allowing the light fixture 10 to be installed in a specific direction when the surface opening has a corresponding chord.

The light fixture light source cover may include a mask portion 31 for preventing the light from being emitted in a specific direction. The emitted light may be directed in a direction substantially perpendicular to an axis 8 of the cylindrical base member 12.

Another aspect of the first embodiment of the light fixture is a method for mounting the light fixture. The method includes ensuring the securing ring is separate from the cylindrical base member and placing the cylindrical base member through, the opening on the surface of the marine vessel. The method includes ensuring the securing ring is engaged with the external base threads and rotating the securing ring until the securing ring contacts the surface of the vessel adjacent the surface opening and securing a male deutsch connector to the female deutsch connector.

Figure 12:
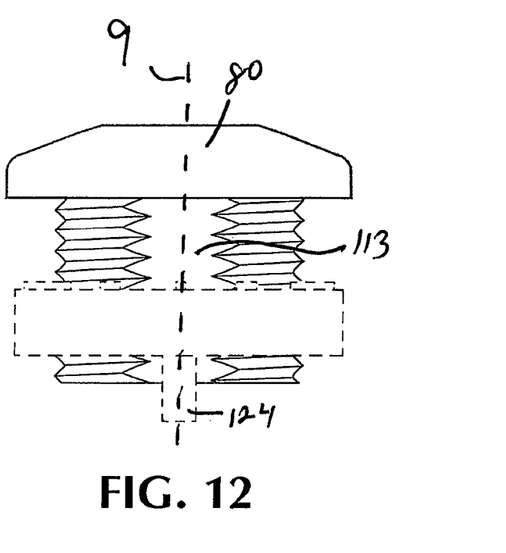
FIG. 12 is a front elevational view of the second embodiment of the "DECK LIGHT" shown in FIG. 9.
Figure 13:
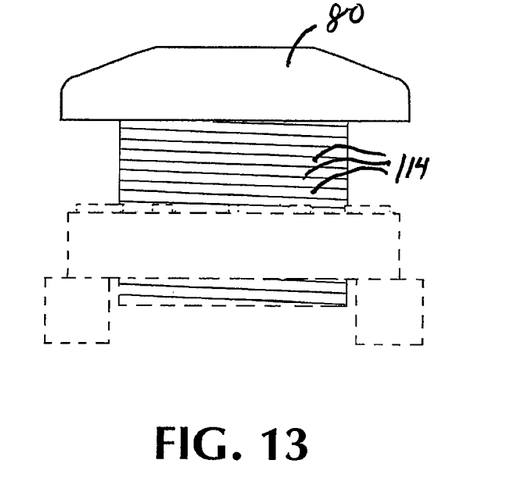
FIG. 13 is a right side elevational view of the second embodiment of the "DECK LIGHT" shown in FIG. 9.
Figure 14:
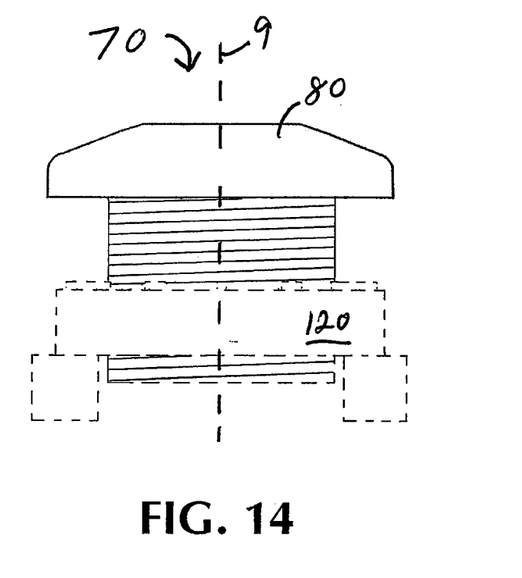
FIG. 14 is a left side elevational view of the second embodiment of the "DECK LIGHT" shown in FIG. 9.
Figure 15:
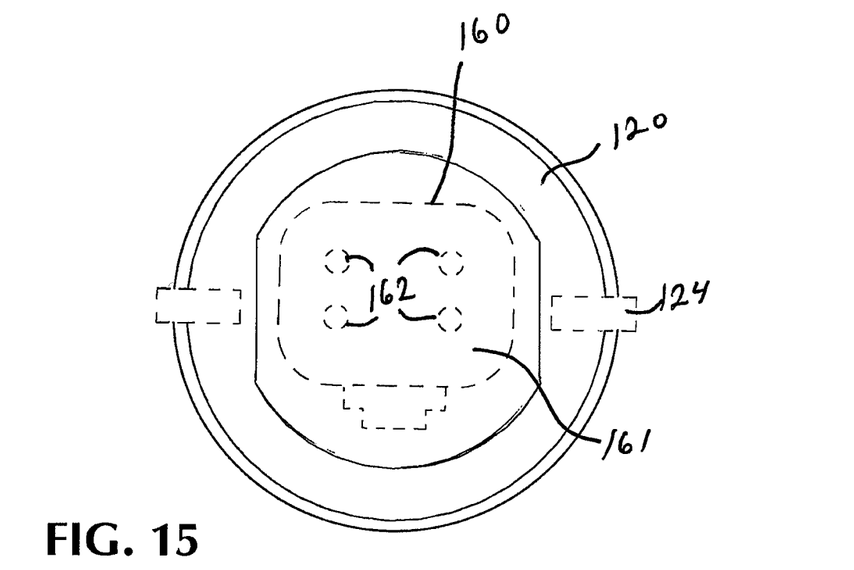
FIG. 15 is a bottom plan view of the second embodiment of the "DECK LIGHT" shown in FIG. 9.
Figure 16:
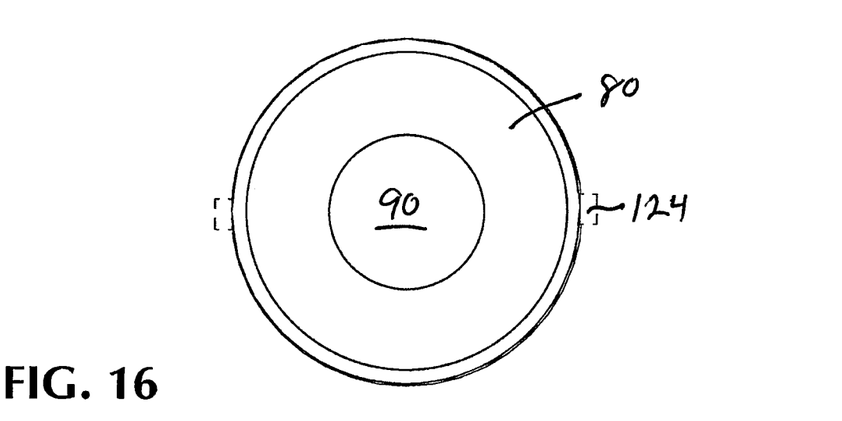
FIG. 16 is a top plan view of the second embodiment of the "DECK LIGHT" shown in FIG. 9.

FIGS. 9-16 show a second embodiment of the deck light or light fixture 70 for mounting in a surface opening on a surface of a marine vessel. The light fixture 70 includes a cylindrical base member 112 having external threads 114 and a light source 152 disposed on a first end of the cylindrical base member 112. The cylindrical base member 112 has an axis 9 as shown in FIGS. 12 and 14. The light fixture 70 includes a mask or light source cover 80 having a cover opening 84 for emitting light produced by the light source 152 and a cover rim 82 extending radially outward from the light source cover 80, the rim 82 having a rim diameter greater than the marine vessel surface opening. The light source cover 80 includes a domed portion 88. The light source cover 80 includes a circular dome opening 84 for directing the light in a direction substantially parallel to the axis 9. The cover opening 84 may include a transparent lens 90 for protecting the light source 152 from moisture or debris. The light fixture 70 directs light substantially parallel to the axis 9 so that when the light fixture 70 is installed in a vertical surface, the light may be directed parallel to the floor of the marine vessel.

The light fixture 70 includes a female deutsch connector 160 disposed on a second end of the cylindrical base member 12, the second end opposite the first end. The female deutsch connector 160 has a cavity 161 and electrical connection pins 162 inside the cavity 161, the female deutsch connector 160 engageable with a male deutsch connector 64. The light source 152 may be mounted on a circuit board 150 for connecting the light source 152 to the female deutsch connector 160. The male deutsch connector 64 includes powered pins 66 energized by marine vessel wires 68 which electrically connect to the electrical connection pins 162 to power the light source 152. The light fixture 70 includes a securing ring 120 having internal threads 122 engageable with the cylindrical base member external threads 114, the cylindrical base member 112 mountable in an opening on the surface of the marine vessel. The securing ring 120 may include tabs 124 for rotation of the securing ring 120 about the cylindrical base member 112. The cylindrical base member 112 may include a base flat portion 113 for allowing the light fixture 70 to be installed in a specific direction when the surface opening has a corresponding chord.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, Thus, having described the invention, what is claimed is:

1. A light fixture for mounting in a surface opening of a marine vessel or RV comprising:
   a cylindrical base member having external threads;
   a light source disposed on a first end of the cylindrical base member;
   a light source cover having a cover opening for emitting light produced by the light source;
   a cover rim extending radially outward from the light source cover, the rim having a rim diameter greater than an opening diameter of the surface opening;
   a first connector disposed on a second end of the cylindrical base member, the second end opposite the first end, the first connector having a cavity and electrical connection pins inside the cavity, the first connector engageable with a second connector, the second connector having powered pins which electrically connect to the electrical connection pins to power the light source; and
   a securing ring having internal threads engageable with the cylindrical base member external threads, the cylindrical base member mountable in an opening on the surface of the marine vessel or RV.

2. The light fixture according to claim 1 wherein the light source cover includes a mask portion for preventing the light from being emitted in a specific direction.

3. The light fixture of claim 2 where the emitted light is directed in a direction substantially perpendicular to an axis of the cylindrical base member.

4. The light fixture of claim 2 where the emitted light is directed in a direction substantially parallel to an axis of the cylindrical base member.

5. The light fixture of claim 3 wherein the light source cover includes a protrusion for including a flat portion, angled side portions and an angled portion extending from the rim to the flat portion.

6. The light fixture of claim 4 wherein the light source cover includes a domed portion and a circular dome opening for directing the light in a direction substantially parallel to the axis.

7. The light fixture according to claim 1 wherein the first connector is a female deutsch connector and the second connector is a male deutsch connector.

8. The light fixture according to claim 1 wherein the first connector is a male deutsch connector and the second connector is a female deutsch connector.

9. A method for mounting a light fixture in a surface opening of a marine vessel or RV comprising:
   providing a light fixture having a cylindrical base member having external threads, a light source disposed on a first end of the cylindrical base member, a light source cover having a cover opening for emitting light produced by the light source, a cover rim extending radially outward from the light source cover, the rim having a rim diameter greater than an opening diameter of the surface opening, a first connector disposed on a second end of the cylindrical base member, the second end opposite the first end, the first connector having a cavity and electrical connection pins inside the cavity, the first connector engageable with a second connector, the second connector having powered pins which electrically connect to the electrical connection pins to power the light source and a securing ring having internal threads engageable with the cylindrical base member external threads, the cylindrical base member mountable in an opening on the surface of the marine vessel or RV;
   ensuring the securing ring is separate from the cylindrical base member;
   placing the cylindrical base member through the opening on the surface of the marine vessel or RV;
   ensuring the securing ring is engaged with the external base threads and rotating the securing ring until the securing ring contacts the surface of the marine vessel or RV adjacent the surface opening; and
   securing a second connector to the first connector, the second connector including an electrical wire which is powerable by a power source on the marine vessel or RV.

10. The method according to claim 9 wherein the light source cover includes a mask portion for preventing the light from being emitted in a specific direction.

11. The method according to claim 10 where the emitted light is directed in a direction substantially perpendicular to an axis of the cylindrical base member.

12. The method according to claim 10 where the emitted light is directed in a direction substantially parallel to an axis of the cylindrical base member.

13. The method according to claim 12 wherein the light source cover includes a protrusion for including a flat portion, angled side portions and an angled portion extending from the rim to the flat portion.

14. The method according to claim 13 wherein the light source cover includes a domed portion and a circular dome opening for directing the light in a direction substantially parallel to the axis.

15. The method according to claim 9 wherein the first connector is a female deutsch connector and the second connector is a male deutsch connector.

16. The method according to claim 9 wherein the first connector is a male deutsch connector and the second connector is a female deutsch connector.

* * * * *

UNITED STATES PATENT AND TRADEMARK OFFICE
CERTIFICATE OF CORRECTION

PATENT NO. : 11,287,096 B1
APPLICATION NO. : 17/015815
DATED : March 29, 2022
INVENTOR(S) : Donald Terry Allen It is certified that error appears in the above-identified patent and that said Letters Patent is hereby corrected as shown below:

In the Specification

Column 4, Line 13, delete "through," and substitute therefor --through--

Signed and Sealed this
Sixth Day of September, 2022

Katherine Kelly Vidal
*Director of the United States Patent and Trademark Office*